Feb. 20, 1923.
A. T. DAWSON ET AL.
MEANS FOR USE IN THE LAYING OF ORDNANCE AND OTHER APPARATUS IN TRAINING.
FILED OCT. 29, 1919.
1,446,336.
2 SHEETS—SHEET 1.
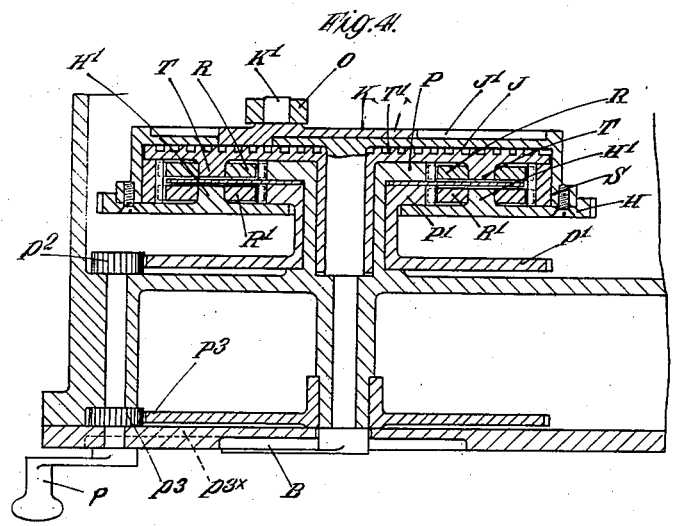
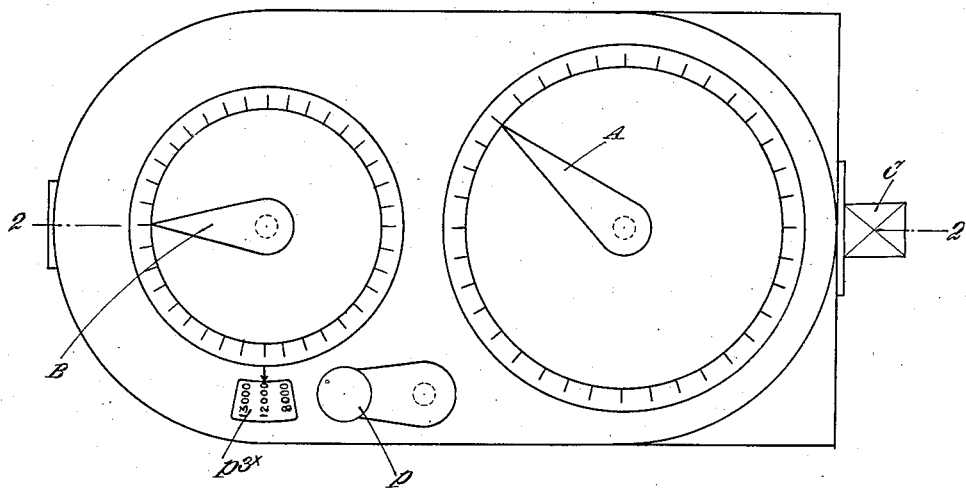
INVENTORS:
Arthur Trevor Dawson
George Edwin Watt
Arthur Leonard Perham
By
Pennie, Davis, Marvin & Edmonds
ATTORNEYS Feb. 20, 1923.
A. T. DAWSON ET AL.
MEANS FOR USE IN THE LAYING OF ORDNANCE AND OTHER APPARATUS IN TRAINING.
FILED OCT. 29, 1919
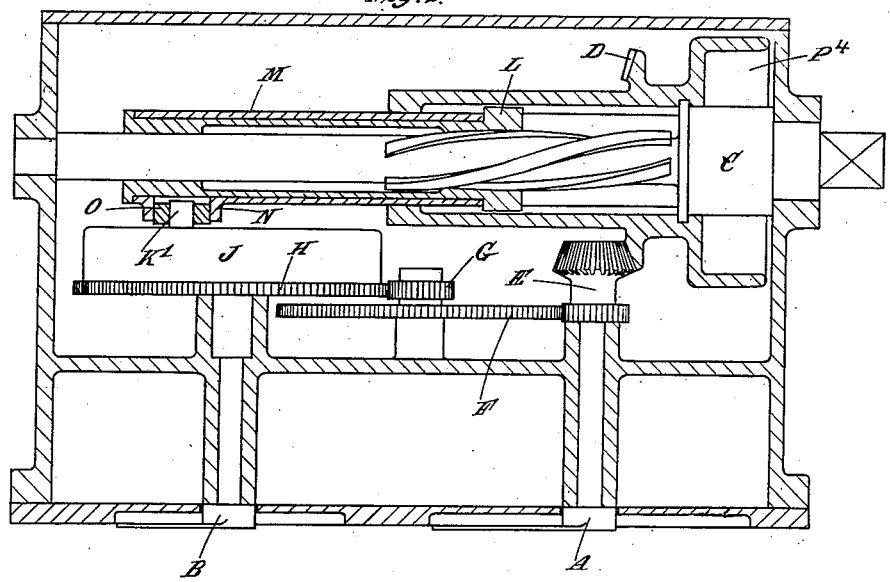
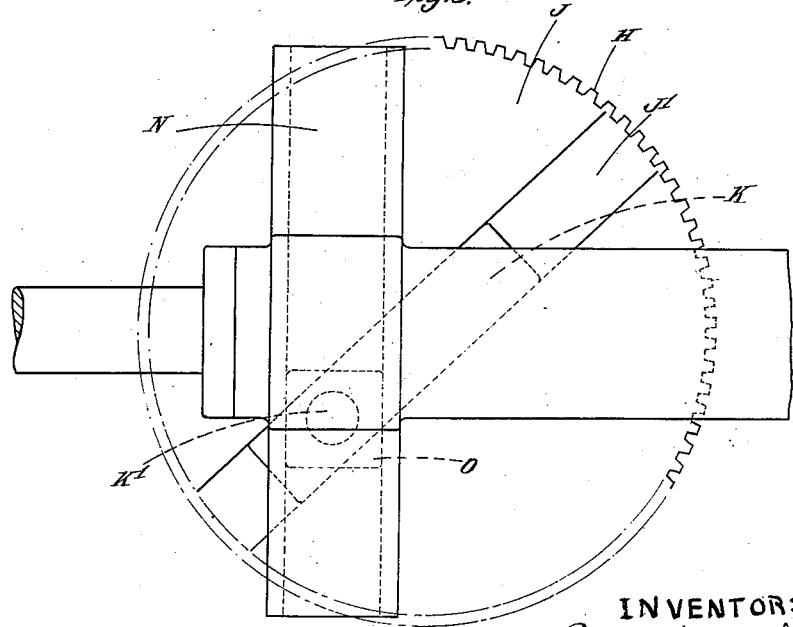
INVENTORS:
Arthur Trevor Dawson
George Edwin Watt
Arthur Leonard Perham
By Pennie, Davis, Marvin & Edmonds
ATTORNEYS Patented Feb. 20, 1923.

1,446,336

UNITED STATES PATENT OFFICE.

ARTHUR TREVOR DAWSON, GEORGE EDWIN WATT, AND ARTHUR LEONARD PERHAM, OF WESTMINSTER, LONDON, ENGLAND, ASSIGNORS TO VICKERS LIMITED, OF WESTMINSTER, LONDON, ENGLAND.

MEANS FOR USE IN THE LAYING OF ORDNANCE AND OTHER APPARATUS IN TRAINING.

Application filed October 29, 1919. Serial No. 334,282.

*To all whom it may concern:*

Be it known that we, Sir ARTHUR TREVOR DAWSON, knight, GEORGE EDWIN WATT, and ARTHUR LEONARD PERHAM, all subjects of the King of Great Britain, residing at Vickers House, Broadway, Westminster, in the county of London, England, have invented certain new and useful Improvements in or Relating to Means for Use in the Laying of Ordnance and Other Apparatus in Training, of which the following is a specification.

This invention relates to means for use in the laying of ordnance and other apparatus (such as searchlights and range-finders) in training in accordance with information or indications transmitted from apparatus (including a sight) at a controlling or sighting station situated at a distance from the gun or guns or other apparatus to be controlled. The object of the invention is to provide means (herein termed a convergence corrector) whereby a correction may be made for the difference in the training angles required between the gun and the sight at the controlling station when the said sight is situated some distance laterally away from the gun it is controlling, so as to make the axis of the sight and the axis of the gun converge on the target. An indicator of the general character of that to which the invention relates is illustrated and described in an application for patent filed by us on October 31, 1919, and serially numbered 334,735.

In the preferred embodiment, the invention involves the combination of a convergence corrector with a training indicator having two intergeared pointers one indicating small angles of training and the other indicating large angles of training. The pointers are operated by the training movements of the gun turntable and by suitable means are given an angular displacement relatively to the shaft by which they are driven from the turntable; and this relative displacement is automatically obtained from a crank pin or other suitable form of crank device (forming part of the convergence corrector) which is geared to the turntable so that it rotates in unison therewith. In carrying out our invention in its simplest form, we arrange that the crank device is carried on the spindle of the pointer that receives an angular movement equal to that of the turntable. Means are provided for adjusting the throw of the crank device and for indicating the amount of such adjustment on a scale engraved in terms of range of the target, and a special device may be employed to enable this scale to remain stationary during the angular displacement of the crank device when the gun is being trained.

In order that the said invention may be clearly understood and readily carried into effect, we will describe the same more fully with reference to the accompanying drawings in which:—

Figure 1 is a front elevation of the aforesaid training indicator provided with a convergence corrector constructed in accordance with our invention.

Figure 2 is a section taken approximately on the line 2—2 of Figure 1,

Figure 3 is a plan shewing the aforesaid crank device of the convergence corrector and its associated parts, and Figure 4 is a view similar to the left hand portion of Figure 2 shewing apparatus (including the aforesaid special device for enabling the range scale to remain stationary during the angular displacement of the crank device) for adjusting the throw of the crank device of the convergence corrector and indicating the amount of the adjustment given, this apparatus not having been shewn in Figure 2. In Figure 4 the handle *p*, hereinafter referred to, has for clearness been shewn in a position different from that occupied by it in Figure 1.

A and B are the two pointers of the training indicator of which the pointer A is in geared connection with the gun turntable or the training mechanism and the pointer B is driven through reducing gearing from the pointer A. The pointer A indicates for example 5° or 6° of training for each complete revolution of the pointer and the pointer B indicates 360° of training for each revolution of the pointer; suitable circular training scales being provided as indicated in Figure 1. The training movement of the gun turntable is transmitted to the pointer A by a shaft C and bevel wheels D, E; the reducing gearing between the pointers A and B comprises spur wheels F, G and H. The aforesaid crank device of the convergence corrector comprises a disc J which moves with the spur wheel H and is formed with a diametrical groove J' to slidably receive a block K having a crank pin K'. The bevel wheel D is adapted to be angularly displaced upon the spindle C, and its relative angular position is determined by a sliding double key L. The outer portion of this key engages with straight keyways cut in the hub or sleeve of the bevel wheel D and the inner portion engages with spiral keys or keyways formed in or on the spindle C, the effect of this arrangement being that the angular position of the bevel wheel D relatively to the spindle C is dependent on the position of the sliding key L along the spindle C; thus by giving a to-and-fro movement to the key L, a corresponding advance or retard of the bevel wheel D on its spindle C takes place. About the key L is mounted a sleeve M in which the key can rotate freely but in which it is constrained by collars from moving in an endwise direction, i. e., in a direction parallel to the axis of the spindle C. On this sleeve M is carried a cross-head or grooved guide N arranged at right angles to the spindle C and in this guide is mounted a small block O with which the aforesaid crank pin K' engages. Thus the endwise movement of the key L is brought under the control of the crank pin K' and the relative advance or retard of the bevel wheel D at any position of the training indicator will depend upon (1) the throw of the crank pin K' which is adjusted by hand in accordance with the range of the target, (2) the angular position of the crank pin and (3) the pitch or shape of the spiral keys or keyways on or in the spindle C. To give a mathematically accurate convergence correction, the spiral keys or keyways should not be truly spiral, but should increase in pitch on each side of the midway position of the key in order that the advance or retard of the bevel wheel D may be in proportion to the sine of the angle of convergence. For small angles of convergence, say below 10°, it will generally give sufficient accuracy, and at the same time facilitate manufacture, if the spiral keys or keyways are made a true spiral of constant pitch.

The construction shewn in Figures 1 and 2 represent a simple and compact arrangement of apparatus constructed according to the invention, but the variable throw crank device may be arranged in many other ways to cause an advance or retard of the bevel wheel D and therefore of the pointers A and B relatively to the shaft C from which they receive motion when the gun mounting or other apparatus is trained. In the aforesaid construction illustrated by Figures 1 and 2 the training indicator has two pointers reading against circular scales engraved in angular values, but the invention can, in a similar manner to that illustrated, be employed in conjunction with the follower pointers of a training indicator having two sets of pointers (viz, two receiving pointers controlled from the controlling station and two follower pointers operated by the gun during training) as is described in an application for patent filed by us on October 31, 1919, and serially numbered 334,735.

The variable throw crank device may be carried otherwise than by the spindle of the pointer B, but the arrangement in Figures 1 and 2 obviates the necessity of supplying the additional gearing that other constructions would require in order to give angular movement to the crank disc J.

To prevent backlash due to imperfect fitting of the key L in its internal and external keyways, a clock spring $P^4$ may be used so as to maintain a continuous torsional pressure in one direction between the bevel wheel D and the spindle C.

To manually adjust the throw of the crank pin K', a convenient device to employ is a disc mounted behind the crank disc J and furnished with a spiral groove or a cam slot of spiral character. This groove or slot engages with a projection on the block K carrying the crank pin K', and in this way relative angular movement between the cam disc and the crank disc J causes a radial movement of the crank pin K' towards or away from the axis of the crank disc. The amount of this relative angular movement may be indicated by a range scale on a disc carried immediately below the pointer B, a projection on the latter serving as an index for reading the graduations of the scale. This scale disc and the cam disc may be coupled rigidly by a sleeve or hollow shaft disposed concentrically around the spindle of the pointer B.

Such an arrangement as that described above is open to the objection that as the scale and the index rotate when the gun is trained, they are not easy to read and to avoid this objection we may arrange that either the scale disc or its index is always stationary and provide gearing so that relative movement between the scale disc and the index only takes place when a corresponding relative rotation between the cam disc and the crank disc occurs. Figure 4 illustrates an example of a suitable form of such gearing. In this example a sun and planet epicyclic gearing is employed, the sun wheel being made in two parts P, P' of which the part P is secured to or made integral with the casing of the instrument and the part P' is connected to a gear wheel $p'$ with which meshes a pinion $p^2$ operated by a handle $p$, the spindle that carries the pinion $p^2$ and the handle $p$ also carrying another pinion $p^3$ meshing with a gear wheel $P^3$ which is marked with range graduations visible through an aperture $p^{3x}$ in the casing. There are two sets R, R' of planet pinions meshing with the sun wheels P, P' respectively and also meshing with an internally toothed ring S which is loosely mounted so as to be free to rotate under the influence of the gearing. The planet pinions R, R are mounted on axis pins T, T projecting from a disc T' hereinbefore referred to as the cam disc and the planet pinions R', R' are mounted on axis pins H', H' projecting from the spur wheel H to which the crank disc J and the pointer B are attached. In this manner, if the sun wheel P' be rotated relatively to the other sun wheel P, it is evident that a proportional relative movement must take place between the parts H and T' carrying the axis pins of the two sets R, R' of planet pinions, and therefore relative movement will occur between the cam disc T' and the crank disc J with a consequent radial displacement of the crank pin K' towards or away from the axis of the disc J, the amount of such displacement being dependent upon the movement given to the handle $p$ and being indicated by the range graduations on the gear wheel $P^3$. When however the crank disc J rotates during training of the gun, the cam disc is compelled by the sun and planet gearing to rotate equally with the crank disc, the toothed ring S acting as a floating connection between the two sets of sun and planet gearing. Other arrangements of gearing may be employed for obtaining the same result.

What we claim and desire to secure by Letters Patent of the United States is:—

1. Means for use in the laying of an element in training in accordance with information or indications transmitted from a controlling sight at a controlling or sighting station situated at a distance laterally from the said element, said means comprising two pointers geared together to move through different angular distances and operated by the training movements of the said element, said pointers forming part of a training indicator, and means whereby the positions of said pointers are automatically varied in accordance with the convergence correction it is required to make due to the angle of training of the said element, the distance of the object upon which said sight and element are required to converge and the horizontal distance between said sight and element.

2. Means for use in the laying of ordnance in training in accordance with information or indications transmitted from a controlling sight at a controlling or sighting station situated at a distance laterally from the gun or guns, said means comprising two pointers geared together to move through different angular distances and operated by the training movements of the gun, said pointers forming part of a training indicator, and means whereby the positions of said pointers are automatically varied in accordance with the convergence correction it is required to make due to the angle of training of the gun, the range of the target and the horizontal distance between the gun and the controlling sight.

3. Means for use in the laying of ordnance in training in accordance with information or indications transmitted from a controlling sight at a controlling or sighting station situated at a distance laterally from the gun or guns, said means comprising two pointers geared together to move through different angular distances and operated by the training movements of the gun, said pointers forming part of a training indicator, a variable throw crank device, means for angularly displacing said device in unison with the training movements of the gun, and means whereby said angular displacement automatically varies the position of said pointers in accordance with the convergence correction required.

4. Means for use in the laying of ordnance in training in accordance with information or indications transmitted from a controlling sight at a controlling or sighting station situated at a distance laterally from the gun or guns, said means comprising two pointers geared together to move through different angular distances and operated by the training movements of the gun, said pointers forming part of a training indicator, a variable throw crank device, means for angularly displacing said device in unison with the training movements of the gun, and means whereby said angular displacement automatically advances or retards the position of a member forming part of said last mentioned means so as to vary the position of the pointers in accordance with the convergence correction required.

5. Means for use in the laying of ordnance in training in accordance with information or indications transmitted from a controlling sight at a controlling or sighting station stituated at a distance laterally from the gun or guns, said means comprising two pointers geared together to move through different angular distances and operated by the training movements of the gun, said pointers forming part of a training indicator, a variable throw crank device, means, including gear wheels, for displacing said device in unison with the training movements of the gun, and means whereby said angular displacement automatically advances or retards the position of one of said gear wheels in relation to a member driving it so as to vary the position of the pointers in accordance with the convergence correction required.

6. Means for use in the laying of ordnance in training in accordance with information or indications transmitted from a controlling sight at a controlling or sighting station situated at a distance laterally from the gun or guns, said means comprising two pointers geared together to move through different angular distances and operated by the training movements of the gun, said pointers forming part of a training indicator, a variable throw crank device, means for angularly displacing said device in unison with the training movements of the gun, means for manually varying the throw of said device, a range scale in accordance with which the last mentioned means are adjusted and means whereby said angular displacement automatically varies the position of the pointers in accordance with the convergence correction required.

7. Means for use in the laying of ordnance in training in accordance with information or indications transmitted from a controlling sight at a controlling or sighting station situated at a distance laterally from the gun or guns, said means comprising two pointers geared together to move through different angular distances and operated by the training movements of the gun, said pointers forming part of a training indicator, a variable throw crank device, means for angularly displacing said device in unison with the training movements of the gun, means, including epicylic gearing, for manually varying the throw of said device, a range scale in accordance with which the last mentioned means are set, and means whereby said angular displacement automatically varies the position of the pointers in accordance with the convergence correction required.

8. Apparatus for training ordnance comprising the combination of an indicator, a driving connection form the device to be trained to the indicator, means for advancing and retarding the indicator with reference to said device, and means for actuating said means automatically from the said driving connection.

9. Apparatus for training ordance comprising the combination of an indicator, a driving connection from the device to be trained to the indicator, means for advancing and retarding the indicator with reference to said device, and means for actuating said means automatically from the said driving connection, the advancing and retarding of the indicator being commensurate with the movements of the indicator actuated by the driving connection.

10. Apparatus for training ordnance comprising the combination of an indicator, a driving connection from the device to be trained to the indicator, means for advancing and retarding the indicator with reference to said device, means for actuating said means automatically from the said driving connection and regulating devices for regulating the magnitude of the advancing and retarding of the indicator with reference to said device.

11. Apparatus for training ordnance comprising the combination of an indicator, a driving connection from the device to be trained to the indicator, a movable member which is included in said connection and whose movement operates to advance or retard the indicator with reference to the said device, and means whereby said driving connection moves said movable member.

12. Apparatus for training ordnance comprising the combination of an indicator, a driving connection from the device to be trained to the indicator, a movable member which is included in said connection and whose movement operates to advance or retard the indicator with reference to said device, and means for moving said member manually or causing it to be moved automatically by said driving connection.

13. A receiving instrument for a system for training ordnance comprising the combination of a casing, a shaft therein arranged to be driven in accordance with training movements of the gun to be trained, a second shaft mounted in the casin, an indicator thereon, a driving connection between said shafts for causing them to rotate in unison, a movable member included in the said driving connection which by its movement advances one of said shafts relatively to the other, and a connection from one of said shafts to the movable member for moving the member as the shaft is rotated.

14. A receiving instrument for a system for training ordnance comprising the combination of a casing, a shaft therein arranged to be driven in accordance with training movements of the gun to be trained, a second shaft mounted in the casing, an indicator thereon, a driving connection between said shafts for causing them to rotate in unison, a movable member included in the said driving connection which by its movement advances one of said shafts relatively to the other, and means for actuating the movable member manually or automatically by one of said shafts.

15. A receiving instrument for a system for training ordnance comprising the combination of a casing, a shaft therein arranged to be driven in accordance with training movements of the gun to be trained, a second shaft mounted in the casing, an indicator thereon, a driving connection between said shafts for causing them to rotate in unison, a movable member included in the said driving connection which by its movement advances one of said shafts relatively to the other, means for moving said member over a predetermined range by and in accordance with rotation of one of said shafts and means for regulating the said range manually.

16. A receiving instrument for a system for training ordnance comprising the combination of a casing, a shaft therein arranged to be driven in accordance with training movements of the gun to be trained, a second shaft mounted in the casing, an indicator thereon, a driving connection between said shafts for causing them to rotate in unison, a movable member included in the said driving connection which by its movement advances one of said shafts relatively to the other, a crank device operated by one of said shafts for moving said member, and means for adjusting the length of the crank arm of the crank device.

17. A receiving instrument for a system for training ordnance comprising the combination of a casing, a shaft therein arranged to be driven in accordance with training movements of the gun to be trained, a second shaft mounted in the casing, an indicator thereon, a driving connection between said shafts for causing them to rotate in unison, an axially movable sleeve included in said driving connection, means operated by one of said shafts for reciprocating said sleeve and means for regulating the range over which this sleeve is reciprocated.

In testimony whereof we affix our signatures.

ARTHUR TREVOR DAWSON.
GEORGE EDWIN WATT.
ARTHUR LEONARD PERHAM.